United States Patent [19]

Sekiguchi

[11] Patent Number: 5,228,881
[45] Date of Patent: Jul. 20, 1993

[54] POULTRY LEG BONING APPARATUS

[75] Inventor: Mitsuaki Sekiguchi, Isehara, Japan

[73] Assignees: Gordex Corporation, Isehara, Japan; Foodcraft Equipment Co., Inc., Lancaster, Pa.; a part interest

[21] Appl. No.: 977,845

[22] Filed: Nov. 17, 1992

Related U.S. Application Data

[62] Division of Ser. No. 854,097, Mar. 19, 1992, Pat. No. 5,178,580.

[30] Foreign Application Priority Data

Apr. 3, 1991 [JP] Japan .................................. 3-71023
Jul. 31, 1991 [JP] Japan ................................. 3-192249

[51] Int. Cl.$^5$ ............................................ A22C 21/00
[52] U.S. Cl. ................................. 452/172; 452/136; 452/166
[58] Field of Search ................ 452/172, 136, 135, 166

[56] References Cited

U.S. PATENT DOCUMENTS

| | | | |
|---|---|---|---|
| 2,836,845 | 6/1958 | Farchmin et al. | 452/136 |
| 2,897,536 | 8/1959 | Bergstrom et al. | 452/136 |
| 3,261,054 | 7/1966 | Kaplan et al. | 452/136 |
| 3,277,516 | 10/1966 | Belknap | 452/172 |
| 3,348,261 | 10/1967 | Segur | 452/136 |
| 3,510,908 | 5/1970 | Segur et al. | 452/136 |
| 3,644,963 | 2/1972 | Terranova | 452/136 |
| 3,965,535 | 7/1976 | Kaplan et al. | 452/136 |
| 4,639,974 | 2/1987 | Olson | 452/136 |
| 4,893,378 | 1/1990 | Hazenbroek et al. | 452/136 |
| 4,993,113 | 2/1991 | Hazenbroek | 452/136 |
| 5,067,927 | 11/1991 | Aazenbroek et al. | 452/136 |
| 5,102,369 | 4/1992 | Martin et al. | 452/136 |
| 5,133,688 | 7/1992 | Hutchison | 452/172 |

FOREIGN PATENT DOCUMENTS

| | | |
|---|---|---|
| 1085788 | 1/1961 | Fed. Rep. of Germany . |
| 2227369 | 1/1973 | Fed. Rep. of Germany . |
| 2258938 | 8/1975 | France . |
| 60-23810 | 6/1985 | Japan . |
| 61-3334 | 2/1986 | Japan . |
| 1065874 | 4/1967 | United Kingdom . |
| 2124883 | 2/1984 | United Kingdom . |
| WO91/04670 | 4/1991 | World Int. Prop. O. . |

OTHER PUBLICATIONS

Bulletins for Food Industry Equipment, International, Inc. High Yield, High Speed Meat Recovery and Meat, Poultry & Fish Trimmers.

Primary Examiner—Willis Little
Attorney, Agent, or Firm—Jacobson, Price, Holman & Stern

[57] ABSTRACT

A poultry leg boning apparatus for removing meat from the upper and lower leg bones of a poultry leg. The apparatus includes a first, cutting machine for cutting open the meat of the poultry leg along one side of the upper and lower leg bones, and a second, tendon cutting machine for removing the lower leg bone from the poultry leg. Also disclosed are methods for cutting open the meat of the poultry leg along one side of the upper and lower leg bones, and removing the meat from the lower leg bone.

6 Claims, 10 Drawing Sheets

POULTRY LEG BONING APPARATUS

This is a divisional of application Ser. No. 07/854,097, filed Mar. 19, 1992, now U.S. Pat. No. 5,178,580.

BACKGROUND OF THE INVENTION

The present invention relates to a poultry leg boning apparatus for removing meat from the poultry legs.

When the meat is manually removed from the poultry leg, the boning work is carried out with a knife by means of the following steps:

(1) cutting the meat of the leg along the upper and lower leg bones;

(2) cutting the knee joint so as to separate the upper leg bone from the lower leg bone;

(3) pulling up the upper leg bone at the lower end thereof or the knee joint and plucking off the upper leg bone from the leg meat;

(4) peeling the meat off the leg along the lower leg bone toward the knee joint so as to make the meat connected only to the knee joint by meat-to-bone connecting tendon tissues; and (5) cutting the meat-to-bone connecting tendon tissues so as to remove the lower leg bone from the leg meat.

The above steps of the manual boning require skill and physical stamina so that it has been desirable to automate them. Especially in the step (1), there has been the problem that, if a force biasing the knife against the bones is too large, the knife chips the bones and the chips of the bones are left on the meat, which decreases the economic value of the meat. Or, if the force biasing the knife against the bones is too small, the knife comes to be detached from the bones and a certain amount of meat is left on the bones, which decreases the yield of the meat removed from the leg. In the step (5), there has been the problem that, it is hard to bias the knife against the knee joint stably because the knee joint is round and the meat-to-bone connecting tendon tissues are hard, this results in a hazard to the operator or may decrease the commercial value of the meat because of the rough cut surface.

Various types of machines and methods for removing the meat from the poultry leg have been proposed. For example, U.S. Pat. No. 2,897,536 to Bergstrom et al, dated Aug. 4, 1959 discloses a machine wherein the leg is passed through a space between a pair of rotating rollers so that the meat is removed from the leg. U.S. Pat. No. 3,261,054 to Kaplan et al, dated Jul. 19, 1966 discloses a machine wherein the leg is passed through a space between a pair of stripper bars so that the meat is removed from the leg. U.S. Pat. No. 3,965,535 to Kaplan et al, dated Jun. 29, 1976 discloses a machine wherein the leg is passed through a space between a pair of discs rotating with their closely spaced peripheral stripping edges in opposition so that the meat is removed from the leg. U.S. Pat. No. 3,348,261 to Segur dated Oct. 24, 1967 discloses a method wherein the meat of the leg is sliced along at least one side of the leg bone, and thereafter the meat is plowed in opposite directions along the upper leg bone and the lower leg bone toward the knee joint. By means of the above machines and methods, the meat of the leg is forced along the leg bone thereby being removed therefrom. Thus, because of excessive deformation during the boning process, the meat, especially the meat of the upper leg portion, is liable to be damaged more seriously compared with the manually processed meat. Japanese Patent Publication No. 60-23810 dated Jun. 10, 1985 discloses a boning machine having a rotating annular cutter belt. By the machine, the meat between the going run of the cutter belt and the returning run of the cutter belt is left on the leg bone, so that the yield rate of the meat removed from the leg is lower than that by the manual separation.

SUMMARY OF THE INVENTION

The present invention is a part of a machine for automatically carrying out all of the steps of manual boning work.

An object of the present invention is to provide a poultry leg bonding apparatus wherein the above steps (1) and (5) in the manual boning process are automated.

Another object of the present invention is to provide a method for carrying out the steps (1) and (5) in the manual boning process.

According to the present invention, there is provided a poultry leg boning apparatus for removing meat from a poultry leg, which apparatus comprises a first, cutting machine for cutting open the meat of the poultry leg along one side of upper leg bone and lower leg bone, and a second, tendon cutting machine for removing the lower leg bone from the poultry leg.

The first cutting machine comprises first clamping means for clamping the ankle of the leg while allowing the leg to rotate around the ankle, and first supporting means for supporting the leg. Cutting means is provided for cutting open the meat of the leg. The cutting means includes a first cutting blade having a wedge-shaped cross section and a vertical cutting edge, a second cutting blade abutting against a first side of the cutting edge of the first cutting blade and slightly protruding from the cutting edge of the first cutting blade, and first driving means for vertically reciprocating the second cutting blade relative to the first cutting blade. The first cutting machine further comprises first biasing means for biasing the leg against a second side of the cutting edge of the first cutting blade, second driving means for vertically moving the cutting means into and out of engagement with the meat of the leg, and third driving means for horizontally moving the first clamping means. The first cutting machine lastly includes restricting means for restricting rotation of the cutting means around a vertical axis when a force directed to the cutting edge of the first cutting blade is smaller than a predetermined magnitude, and permitting the rotation of the cutting means around the vertical axis when a force directed to the cutting edge of the first cutting blade is larger than the predetermined magnitude.

The second, tendon cutting machine for removing the lower leg bone from the poultry leg includes a rigid annular cutting blade having an annular cutting edge and a side away from the cutting edge, second supporting means for supporting the annular cutting blade rotatably around a central axis, and fourth driving means for rotating the annular cutting blade around the central axis. The tendon cutting machine further comprises second clamping means for clamping the ankle of the leg, which clamping means is disposed coaxially with the central axis of the annular cutting blade, and apart from the annular cutting blade toward the side away from the cutting edge, fifth driving means for generating a relative movement between the second clamping means and the annular cutting blade in the direction of the central axis of the annular cutting blade, and second biasing means for biasing the knee joint of the leg against the cutting edge of the annular cutting blade.

The apparatus lastly includes a working table assembly disposed between the cutting machine and the tendon cutting machine comprising conveying means for conveying the leg, and a working table.

According to a preferred embodiment of the present invention, the restricting means includes a vertical shaft member fixed to the cutting means, which shaft member is located offset relative to the first and the second cutting blades in a direction at right angles to the direction of the horizontal movement of the first clamping means. Spring means is provided for applying a predetermined initial moment to the cutting means, thereby driving the cutting means rotationally around the vertical axis of the shaft member. Stopper means restricts the rotation of the cutting means by the initial moment when a force directed to the cutting edge of the first cutting blade is smaller than a predetermined magnitude, thereby making the second side of the cutting edge of the first cutting blade extend in the direction of the horizontal movement of the first clamping means.

According to another preferred embodiment of the present invention, the first clamping means includes a first clamping member having a groove extending in the direction of the horizontal movement of the first clamping means, a second clamping member disposed adjacent to the first clamping member and behind the first clamping member in the direction of the horizontal movement of the first clamping means. The second clamping member is provided with a cutout facing the groove of the first clamping member. The breadth of the cutout is smaller than that of the groove of the first clamping member. The first clamping means further includes means for rotating the first clamping member relative to the second clamping member around an axis extending in the direction of the horizontal movement of the first clamping means between a first position wherein the open end of the groove of the first clamping member is directed in the same direction as the open end of the cutout of the second clamping member and a second position wherein the open end of the groove of the first clamping member is directed at right angles to the open end of the cutout of the second clamping member.

According to still another preferred embodiment of the present invention, the second biasing means includes a pair of rods disposed apart from the annular cutting blade on the side of the cutting edge thereof, extending on either side of the central axis and being inclined relative to the central axis.

The tendon cutting machine may further includes means for separately collecting the lower leg bone and the meat removed from the lower leg bone.

According to another aspect of the present invention, there is provided a method for removing meat from the lower leg bone of a poultry leg. The method includes peeling the meat off the lower leg bone from an ankle thereof toward a knee joint thereof so as to make the meat connected only to the knee joint by meat-to-bone connecting tendon tissues. The lower leg bone is then passed through a rigid annular cutting blade. The cutting blade has a cutting edge extending along one of the annular side surfaces thereof. The lower leg bone is passed through the rigid annular cutting blade from that one of the annular side surfaces to the other. The ankle is directed in the direction of the movement of the lower leg bone. The method further includes rotating the annular cutting blade around a central axis, and biasing the knee joint against the cutting edge of the rotating cutting blade.

The lower leg bone may be reciprocally rotated around the longitudinal axis thereof during the movement.

According to still another aspect of the present invention, there is provided a method for cutting open meat along the upper and lower leg bones of a poultry leg. The method includes clamping an ankle of the poultry leg while allowing the leg to rotate around its ankle, and supporting the leg. Cutting means is brought in engagement with the meat of the poultry leg. The cutting means includes a first wedge-shaped cutting blade and an adjacent second reciprocating cutting blade, wherein the reciprocating blade has an edge protruding slightly from an edge of the first cutting blade. The method further includes biasing the leg against the edge of the first cutting blade, and generating a relative movement between the cutting means and clamping means for clamping the leg while reciprocating the second cutting blade. The rotation of the cutting means around a vertical axis is restricted when a force directed to the edge of the first cutting blade is smaller than a predetermined magnitude. The rotation of the cutting means around the vertical axis is permitted when the force directed to the edge of the first cutting blade is larger than a predetermined magnitude, whereby the meat is cut open adjacent the upper and lower leg bones without chipping the bones.

Further objects, features and advantages of the present invention will become apparent from the Detailed Description of the Preferred Embodiments when read in conjunction with the accompanying drawings.

DETAILED DESCRIPTION OF THE PREFERRED EMBODIMENTS

Figure 1:
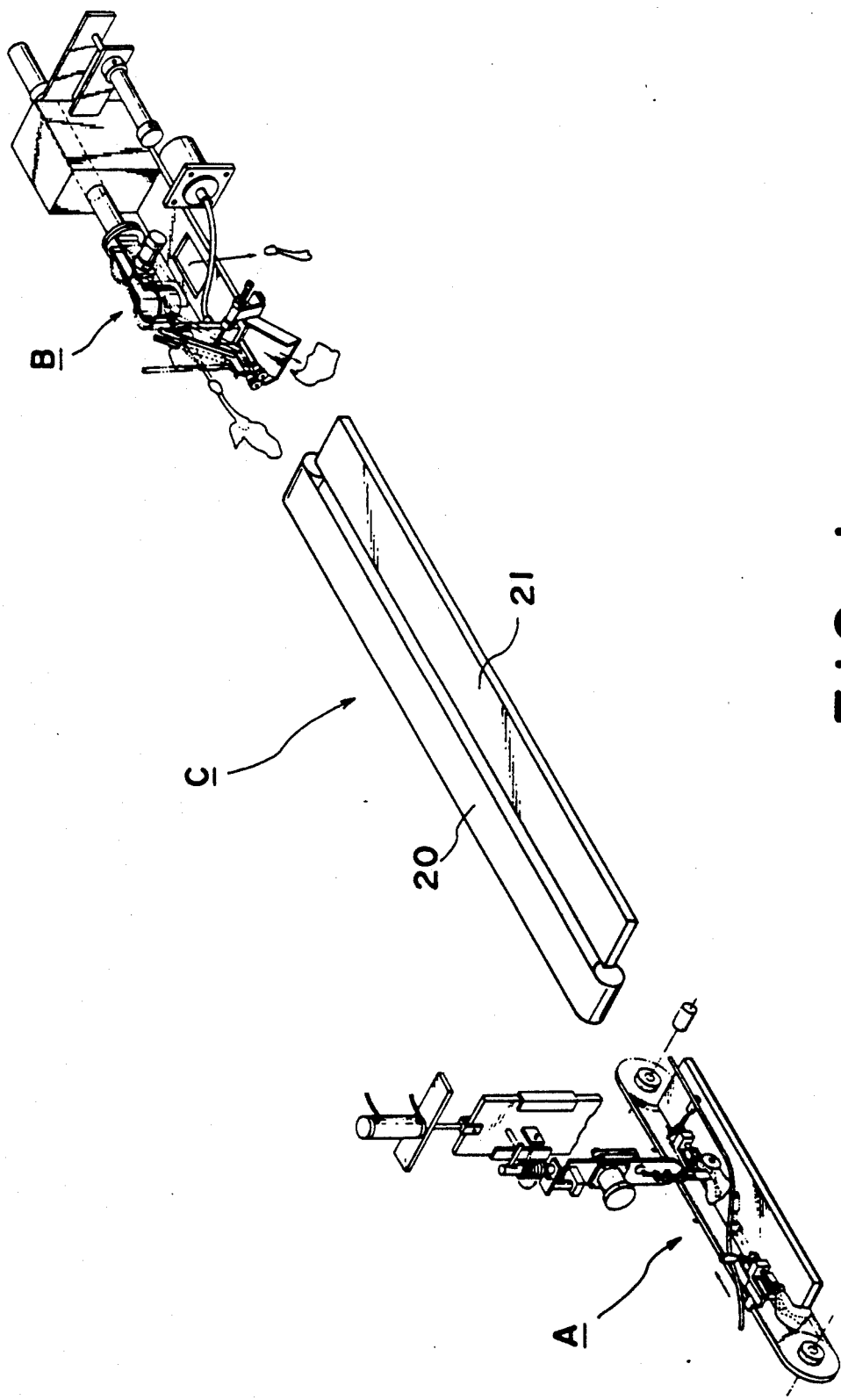
FIG. 1 is a perspective view showing a general arrangement of a poultry leg boning apparatus in accordance with the preferred embodiment of the present invention.

Referring to FIG. 1, a poultry leg boning apparatus in accordance with the preferred embodiment of the present invention comprises a first, cutting machine A for cutting open the poultry leg along the upper leg bone and the lower leg bone, a second, tendon cutting machine B for removing the lower leg bone of the poultry leg, and a working table C disposed between the cutting machine A and the tendon cutting machine B. In the poultry leg boning apparatus, the step (1) in the manual boning process is carried out automatically by the cutting machine A, and the step (5) in the manual boning process is carried out automatically by the tendon cutting machine B. The steps (2)–(4) in the manual boning process are carried out manually on the working table C.

The cutting machine A, the tendon cutting machine B, and the working table C will be described in detail as follows.

First, Cutting Machine A

Figure 2:
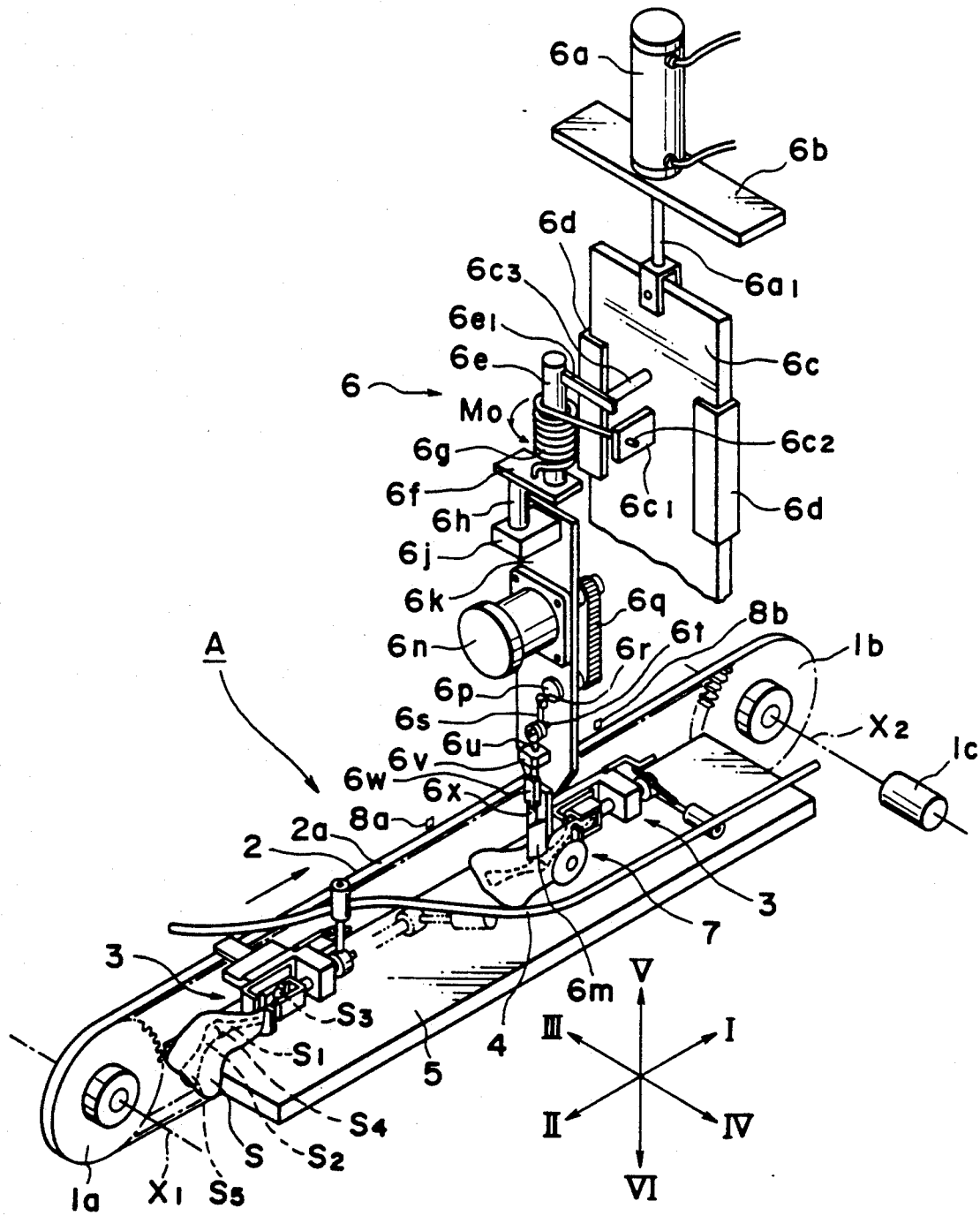
FIG. 2 is a perspective view showing a first, cutting machine for cutting open a poultry leg along the upper leg bone and the lower leg bone, which defines a part of the poultry leg boning apparatus in FIG. 1.

The first, cutting machine A will be described with reference to FIGS. 2 to 8. The cutting machine A described in the following is so constructed as to cut open right poultry legs. In the following descriptions, the directions indicated by arrows I, II, III, IV, V and VI in FIG. 2 are referred to as forward direction, rearward direction, leftward direction, rightward direction, upward direction and downward direction, respectively. Moreover, in the following descriptions, the direction parallel to the arrows I, II is referred to as the longitudinal direction, the direction parallel to the arrows III, IV is referred to as the transverse direction, and the direction parallel to the arrows V, VI is referred to as the vertical direction, respectively.

In FIG. 2, $1a$, $1b$ are sprockets supported by the frame of cutting machine A. Sprockets $1a$, $1b$ are rotatably supported around horizontal axes $x_1$, $x_2$, respectively. The horizontal axes $x_1$, $x_2$ extend in parallel with one another and in the transverse direction. The frame of the cutting machine A is not illustrated for simplicity. An endless chain 2 engages the sprockets $1a$ and $1b$. A motor $1c$ drives the sprocket $1b$, and thereby drives the upper run $2a$ of the endless chain 2 forward.

As shown in FIG. 2, the endless chain 2 has a plurality of clamp assemblies 3 for clamping poultry legs. These assemblies 3 are fixed to the chain 2 at a predetermined distance with each other.

Figure 3:
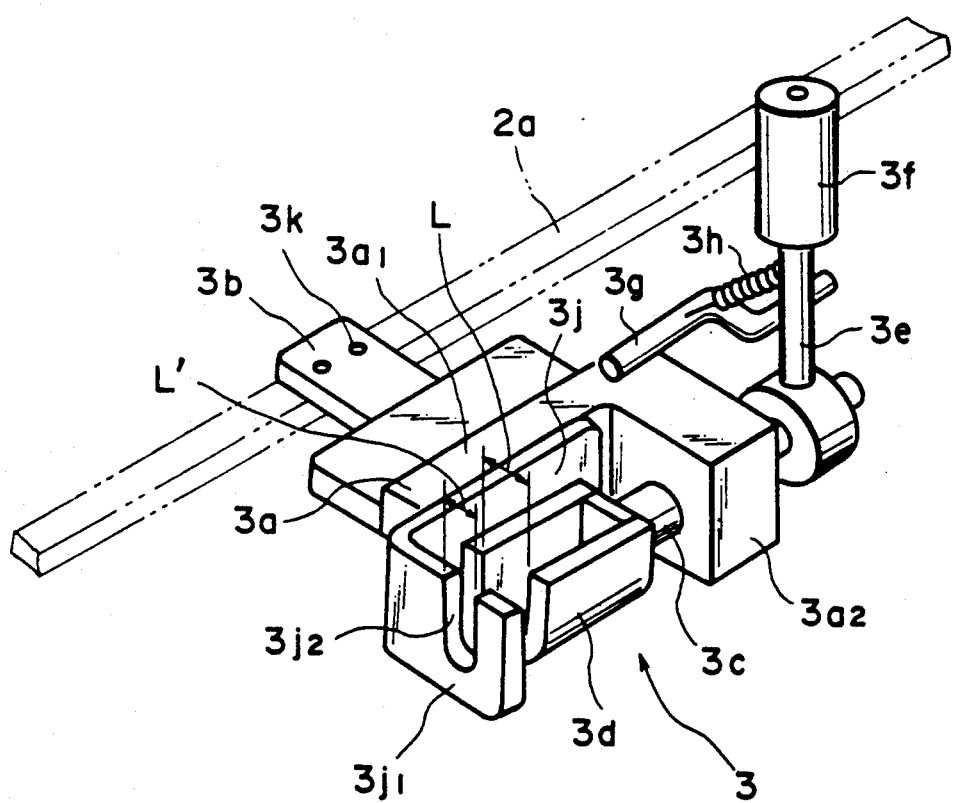
FIG. 3 is an enlarged detail of a clamp assembly for clamping a poultry leg, which defines a part of the cutting machine of FIG. 2.

The construction of the clamp assembly 3 will be described with reference to FIG. 3. The clamp assembly 3 includes a body $3a$, the horizontal cross section of which is hook-shaped. A leg $3a_1$ of the body $3a$ extends in the longitudinal direction, and the other leg $3a_2$ of the body $3a$ extends rightward from the fore end of the leg $3a_1$. The leg $3a_1$ is fixed to the endless chain 2 by a bracket $3b$ which extends leftward from the leg $3a_1$. A shaft $3c$ extends in the longitudinal direction through the leg $3a_2$. The shaft $3c$ is carried by the leg $3a_2$ so that it rotates around its longitudinal axis and is fixed in the longitudinal direction. A first clamping member $3d$ is fixed to the rear end of the shaft $3c$. The first clamping member $3d$ comprises a channel bar having an U-shaped groove extending in the longitudinal direction and closed at its fore end. An arm $3e$ extends at a right angles to the shaft $3c$, and is fixed to the fore end of the shaft $3c$ at one end.

The other end of the arm $3e$ is provided with a guide-roll $3f$, which is rotatable around the arm $3e$. A stopper $3g$ is fixed to the upper surface of the fore end of the leg $3a_1$. A spring $3h$ connects the stopper $3g$ with the arm $3e$. The arm $3e$ is biased toward the stopper $3g$ around the longitudinal axis of the shaft $3c$ by the spring $3h$, and is abutted against the stopper $3g$, so that the arm $3e$ is held upright when no rightward force works on the guide-roll $3f$.

When the arm $3e$ is held upright, the open end of the U-shaped groove of the first clamping member $3d$ is directed upward.

Hereinafter, the condition wherein the arm $3e$ is abutted against the stopper $3g$ so as to be held upright, and the open end of the U-shaped groove of the first clamping member $3d$ is directed upward, is referred to as the initial condition of the clamp assembly 3. A second clamping member $3j$ is fixed to the right side surface of the leg $3a_1$. The second clamping member $3j$ is bent rightward at a rear end portion $3j_1$. A clearance is provided between the rear end portion $3j_1$ of the second clamping member $3j$ and the rear end of the first clamping member $3d$. The rear end portion $3j_1$ is provided with a U-shaped cutout $3j_2$ having an open upper end. The U-shaped cutout $3j_2$ is aligned with the U-shaped groove of the first clamping member $3d$ in the initial condition of the clamp assembly 3. The width L' of the U-shaped cutout $3j_2$ of the second clamping member $3j$ is a little smaller than the width L of the U-shaped groove of the first clamping member $3d$. The bracket $3b$ is provided with a protrusion $3k$ on its upper surface.

As shown in FIG. 2, a line cam 4 made of a curved rod is disposed to the right of the upper run $2a$ of the endless chain 2. The line cam 4 extends in the longitudinal direction. The line cam 4 is disposed to the left of and above the clamp assembly 3 in the vicinity of the rear end of the upper run $2a$ of the endless chain 2. At the midway point of the upper run $2a$, the line cam 4 is bent to the right of the clamp assembly 3 and is also bent downward to a height a little higher than the shaft $3c$ of the clamp assembly 3. In the vicinity of the fore end of the upper run $2a$ of the endless chain 2, the line cam 4 is disposed at a height a little higher than the shaft $3c$ of the clamp assembly 3, to the right of the clamp assembly 3, and extends in the longitudinal direction. The line cam 4 is fixed to the frame (not shown) of the cutting machine A.

As shown in FIG. 2, a rectangular table 5 is disposed to the right of the endless chain 2. The rectangular table 5 is disposed a little below the clamp assembly 3 fixed to the upper run $2a$ of the endless chain 2, and extends horizontally and longitudinally. The rectangular table 5 is also fixed to the frame of the cutting machine A.

As shown in FIG. 2, a cutter assembly 6 is disposed in the vicinity of the fore end of the upper run $2a$ of the endless chain 2. The cutter assembly 6 is disposed to the right of the upper run $2a$.

The cutter assembly 6 has an air cylinder $6a$. The air cylinder $6a$ is fixed to the frame of the cutting machine A by a bracket $6b$. The piston $6a_1$ of the air cylinder $6a$ extends downward. The upper end of a rectangular cutter base $6c$ is connected to the lower end of the piston $6a_1$. The cutter base $6c$ is supported to move only in the vertical direction by guides $6d$ fixed to the frame of the cutting machine A. A rotation shaft $6e$ disposed to the rear of the cutter base $6c$ and extending in the vertical direction is supported rotatably around its vertical axis by two bearings fixed to the cutter base $6c$. The two bearings are not illustrated for simplicity.

A coil spring $6g$ fits on the rotation shaft $6e$. The coil spring $6g$ engages, with one end, a hole $6c_2$ of an eye plate $6c_1$. The eye plate $6c_1$ is fixed to the cutter base $6c$ and extends rearward. The other end of the coil spring $6g$ is fixed to a plate member $6f$ which is in turn fixed to the lower end of the rotation shaft $6e$. The coil spring $6g$ applies an initial moment $M_0$ to the rotation shaft $6e$ so as to drive the rotation shaft $6e$ rotationally in the direction indicated by a double arrow, or counterclockwise as viewed downward.

An arm $6e_1$ is fixed to the upper end of the rotation shaft $6e$. The arm $6e_1$ abuts against a stopper $6c_3$ which is fixed to the cutter base $6c$ and extends rearward, thereby keeping the rotation shaft $6e$ from rotating in the direction indicated by the double arrow.

The upper end of a connection shaft $6h$ is fixed to the lower surface of the plate member $6f$. The lower end of the connection shaft $6h$ is fixed to a connection bracket $6j$. The connection shaft $6h$ is located offset leftwardly relative to the rotation shaft $6e$.

The upper end of a cutter body $6k$ is fixed to the connection bracket $6j$. The cutter body $6k$ is located offset forwardly relative to the connection shaft $6h$. The cutter body $6k$ comprises a rectangular plate and is provided with a fixed cutting blade $6m$ at its lower end.

Figure 4:
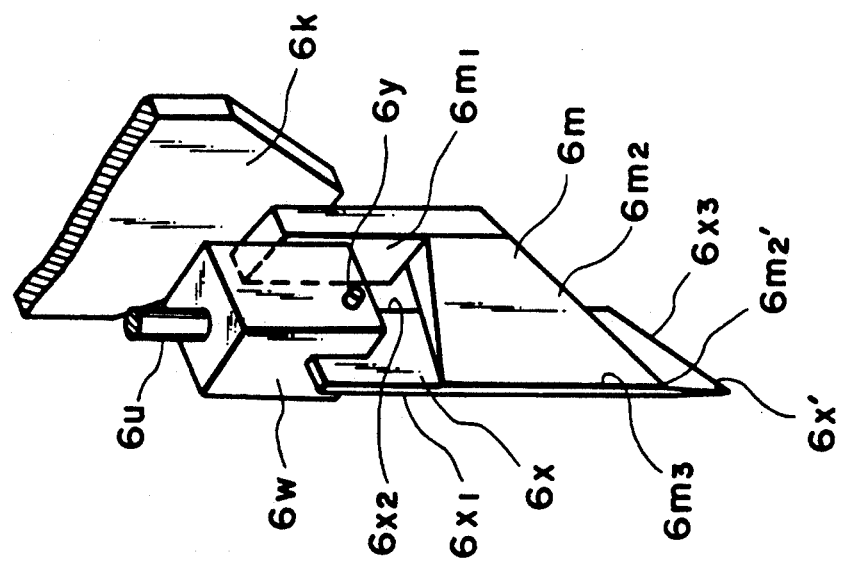
FIG. 4 is an enlarged detail of cutting blades of the cutter assembly of the cutting machine of FIG. 2.

As shown in FIG. 4, the fixed cutting blade $6m$ comprises an upper portion $6m_1$ made of a rectangular plate, and a lower portion $6m_2$. The lower portion $6m_2$ has a wedge shaped configuration in horizontal cross section and extends rearward from the lower end of the upper portion $6m_1$. The front surface of the upper portion $6m_1$ is fixed to the rear surface of the cutter body $6k$. The wedge shaped horizontal sectional configuration of the lower portion $6m_2$ is formed such that the rear portion is thinner than the fore portion, and the maximum thickness of the fore portion is substantially one half of the width of the upper portion $6m_1$. The lower portion $6m_2$ is located offset rightward relative to the centerline of the upper portion $6m_1$. The lower edge of the lower portion $6m_2$ inclines downward from its fore end toward its rear end, so that the rear edge of the lower edge of the lower portion $6m_2$ forms a sharp tip $6m_2'$.

As shown in FIG. 2, a motor $6n$ mounted on the cutter body $6k$. A shaft $6p$ extends through the cutter body $6k$ below the motor $6n$, and is rotatably supported around its longitudinal axis by the cutter body $6k$. The shaft $6p$ is connected to the output shaft of the motor $6n$ by a belt $6q$. A pin $6r$ is eccentrically fixed to the rear end of the shaft $6p$ and extends rearward. A rod $6s$ is rotatably supported by the rear end portion of the pin $6r$ around the longitudinal axis of the pin $6r$ and extends downward. A pin $6t$ is rotatably supported around its longitudinal axis by the lower end portion of the rod $6s$ and extends rearward. A rod $6u$ is rotatably supported by the pin $6t$ around the longitudinal axis of the pin $6t$ and extends downward. The rod $6u$ is supported, movably in the vertical direction, by a guide $6v$ fixed to the cutter body $6k$. A block $6w$ is fixed to the lower end of the rod $6u$.

As shown in FIG. 4, the upper end of a movable cutting blade $6x$, made of a thin rectangular plate, fits within a slit in the block $6w$. The slit is formed on the lower surface of the block $6w$ and extends in the longitudinal direction. The movable cutting blade $6x$ is fixed to the block $6w$ by means of a pin $6y$. The block $6w$ is located such that its fore surface abuts against the rear surface of the upper portion $6m_1$ of the fixed cutting blade $6m$. The movable cutting blade $6x$ is located so as to abut against the left side surface of the lower portion $6m_2$ of the fixed cutting blade $6m$. The left side surface defines the rear edge of the lower portion $6m_2$ or a cutting edge $6m_3$. The movable cutting blade $6x$ is located so as to protrude slightly rearward from the cutting edge $6m_3$ at its rear edge $6x_1$. The lower edge of the movable cutting blade $6x$ is sharpened to form a sharp cutting edge $6x_3$, and is made inclined downward from the fore end to the rear end so that the rear edge of the lower edge of the movable cutting blade $6x$ forms a sharp tip $6x'$. The movable cutting blade $6x$ is located such that the cutting edge $6x_3$ protrudes slightly downward from the lower edge of the lower portion $6m_2$ of the fixed cutting blade $6m$ when the movable cutting blade $6x$ is in the lowest position.

The movable cutting blade $6x$ is disposed to the left of and to the rear of the rotation shaft $6e$ when the initial moment $M_0$ is applied to the rotation shaft $6e$ so as to drive the shaft $6e$ rotationally in the direction indicated by the double arrow. Moreover, the arm $6e_1$ abuts against the stopper $6c_3$, thereby keeping the rotation shaft $6e$ from rotating in the direction indicated by the double arrow. In this condition, the movable cutting blade $6x$ inclines slightly rightward from the fore edge $6x_2$ toward the rear edge $6x_1$ as viewed downward. Also in this condition, the right side surface of the lower portion $6m_2$ of the fixed cutting blade $6m$, which defines the cutting edge $6m_3$, extends in the longitudinal direction.

The cutter assembly 6 is located such that the movable cutting blade $6x$ is situated in the vicinity of the left end of the cutout $3j_2$ of the second clamping member $3j$.

Hereinafter, what is referred to as the initial rotational condition of the movable cutting blade $6x$ is the condition in which an initial moment $M_0$ is applied to the rotation shaft $6e$ so as to drive the shaft $6e$ rotationally in the direction indicated by the double arrow. In the initial rotational condition, the arm $6e_1$ abuts against the stopper $6c_3$ thereby keeping the rotation shaft $6e$ from rotating in the direction indicated by the double arrow, the movable cutting blade $6x$ is disposed to the left of and to the rear of the rotation shaft $6e$, the movable cutting blade $6x$ inclines slightly rightward from the fore edge $6x_2$ toward the rear edge $6x_1$ as viewed downward, and the right side surface of the lower portion $6m_2$ of the fixed cutting blade $6m$ extends in the longitudinal direction.

Figure 5:
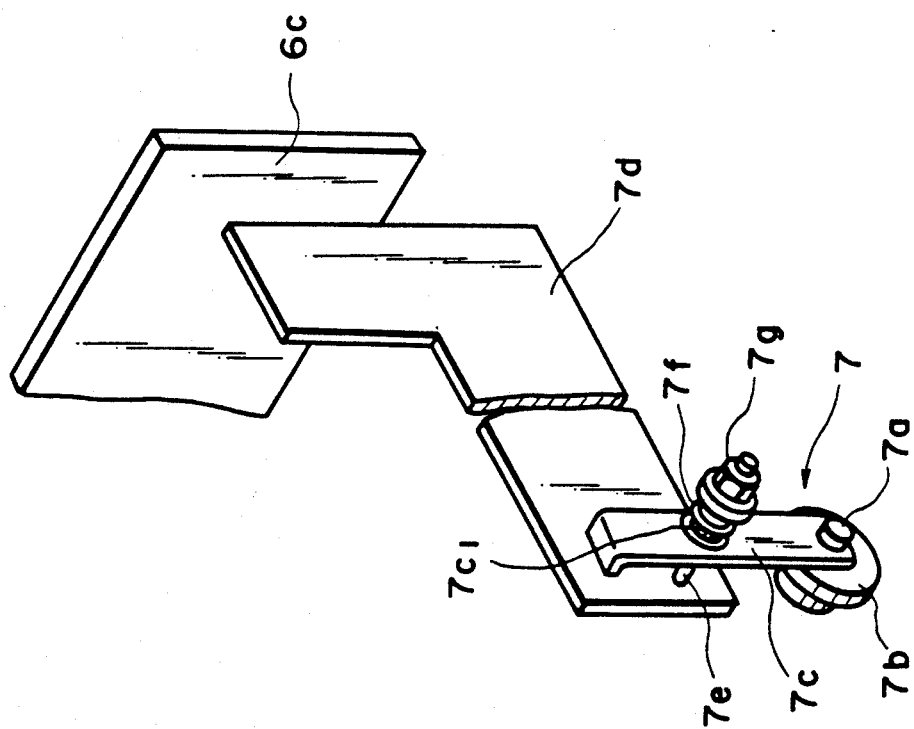
FIG. 5 is a perspective view showing a biasing roll assembly of the cutting machine of FIG. 2.

As shown in FIG. 2, a biasing roll assembly 7 is disposed to the right of the fixed cutting blade $6m$. As shown in FIG. 5, the biasing roll assembly 7 has a biasing roll $7b$ rotatably supported by a shaft $7a$ which extends in the transverse direction. The shaft $7a$ is fixed to the lower end portion of an upwardly-extending rectangular plate $7c$. The upper end of plate $7c$ is bent leftward and fixed to the rear end portion of a bracket $7d$. The fore end portion of the bracket $7d$ extends upward and is fixed to the cutter base $6c$ at its upper end portion. A rod $7e$ extends in the transverse direction through a hole $7c_1$ formed in the mid portion of the plate $7c$. The left end of rod $7e$ is fixed to the bracket $7d$. The portion of the rod $7e$ located to the right of the plate $7c$ is fitted with a coil spring $7f$. A nut $7g$ engages the right end portion of the rod $7e$ so as to apply a compressive force to the coil spring $7f$.

As shown in FIG. 2, a limit switch $8a$ is disposed to the rear of the movable cutting blade $6x$ of the cutter assembly 6 and just above the upper run 2a of the endless chain 2. A limit switch 8b is disposed to the fore of the movable cutting blade 6x of the cutter assembly 6 and just above the upper run 2a of the endless chain 2. The limit switches 8a, 8b are fixed to the frame of the cutting machine A. The limit switches 8a, 8b detect the existence of the clamp assembly 3 when they abut against the protrusion 3k provided on the upper surface of the bracket 3b of the clamp assembly 3. Based on the detection signal from the limit switch 8a, the piston $6a_1$ of the air cylinder 6a advances downward, and the motor 6n starts. Based on the detection signal from the limit switch 8b, the piston $6a_1$ of the air cylinder 6a retracts upward, and the motor 6n stops.

The operation of the above constructed cutting machine A is described as follows.

An electric power supply of the cutting machine A is turned on, the motor 1c starts, and the upper run 2a of the endless chain 2 moves forward as indicated by an arrow in FIG. 2. The piston $6a_1$ of the air cylinder 6a is in a retracted position so that the cutter body 6k is pulled up. The initial moment $M_0$ is applied to the rotation shaft 6e so as to drive the rotation shaft 6e in the direction indicated by the double arrow. The arm $6e_1$ then abuts against the stopper $6c_3$ thereby keeping the rotation shaft 6e from rotating in the direction indicated by the double arrow. The movable cutting blade 6x is disposed to the left of and to the rear of the rotation shaft 6e, the movable cutting blade 6x is inclined slightly rightward from the fore edge $6x_2$ toward the rear edge $6x_1$ as viewed downward, and the right side surface of the lower portion $6m_2$ of the fixed cutting blade 6m extends in the longitudinal direction. That is, the cutting blade 6x is in the initial rotational condition.

Then, as shown in FIG. 2, a right leg S is set into the clamp assembly 3 by an operator, which assembly 3 is located in the vicinity of the rear end of the upper run 2a of the endless chain 2. The clamp assembly 3 is in the initial condition wherein the open end of the U-shaped groove of the first clamping member 3d is directed upward.

The right leg S is set by the following procedure.

① The inner side surface of the leg S is directed leftward and the outer side surface of the leg S is directed rightward, and the connecting joint between the lower leg bone $S_1$ and the upper leg bone $S_2$ or the knee joint $S_4$ of the leg S protrudes upward.

② The lower end of the lower leg bone $S_1$ or the ankle $S_3$ of the leg S is inserted into the U-shaped groove of the first clamping member 3d, and the portion of the lower leg bone $S_1$ adjacent to the ankle $S_3$ is inserted into the U-shaped cutout $3j_2$ of the second clamping member 3j.

Thus, the ankle $S_3$ of the leg S is clamped by the first clamping member 3d, and the portion of the lower leg bone $S_1$ adjacent to the ankle $S_3$ is clamped by the second clamping member 3j.

The leg S set into the clamp assembly 3 then moves forward following the forward movement of the clamp assembly 3 which is driven by the upper run 2a of the endless chain 2. The forward movement of the clamp assembly 3 causes the engagement between the guide-roll 3f and the line cam 4. The guide-roll 3f or the first clamping member 3d is guided by the line cam 4 so as to rotate, against the biasing force of the spring 3h, by 90°, clockwise as viewed in the forward direction. Following the rotation of the first clamping member 3d, the right leg S clamped by the first clamping member 3d is also rotated by 90°, so that the inner side surface of the right leg S is directed upward and the outer side surface of the right leg S abuts against the upper surface of the table 5.

Thereafter, the upper leg bone $S_2$, the lower leg bone $S_1$ and the ankle $S_3$ are all in the same horizontal plane. As viewed downward, the lower leg bone $S_1$ inclines slightly rightward from its fore end toward its rear end, the upper leg bone $S_2$ inclines slightly leftward from its fore end toward its rear end. The open end of the U-shaped groove of the first clamping member 3d is directed rightward, and the open end of the U-shaped cutout $3j_2$ of the second clamping member 3j is directed upward.

Thus, the ankle $S_3$ of the leg S can not be released from the first clamping member 3d and the second clamping member 3j in either the vertical direction or the transverse direction. The ankle $S_3$ of the leg S can not go through the U-shaped cutout $3j_2$ of the second clamping member 3j the width L' whereof is made a little smaller than the width L of the U-shaped groove of the first clamping member 3d, so that the ankle $S_3$ of the leg S can not be released from the clamping by the first clamping member 3d and the second clamping member 3j further in the longitudinal direction. The width L of the U-shaped groove of the first clamping member 3d is made larger than the width of the ankle $S_3$ of the leg S and the width L' of the U-shaped cutout $3j_2$ of the second clamping member 3j is made larger than the width of the portion of the lower leg bone $S_1$ adjacent to the ankle $S_3$, so that the leg S can rotate to some extent around the ankle $S_3$ in a horizontal plane.

When the clamp assembly 3 moves forward further and the rotation of the first clamping member 3d by 90° is completed, the limit switch 8a detects the existence of the clamp assembly 3, the piston $6a_1$ of the air cylinder 6a advances downward from the retracted position, and the motor 6n starts. Following the advance of the piston $6a_1$, the cutter base 6c or the cutter body 6k moves downward. Following the downward movement of the cutter base 6c, the biasing roll assembly 7 or the biasing roll 7b also moves downward. After the start of the motor 6n, the shaft 6p rotates via the belt 6q, the eccentric pin 6r rotates, and the rod 6u reciprocates in the vertical direction via the rod 6s and the pin 6t, so that the movable cutting blade 6x reciprocates vertically between its lowest and highest positions.

Figures 6A, 6B, 6C, 6D:
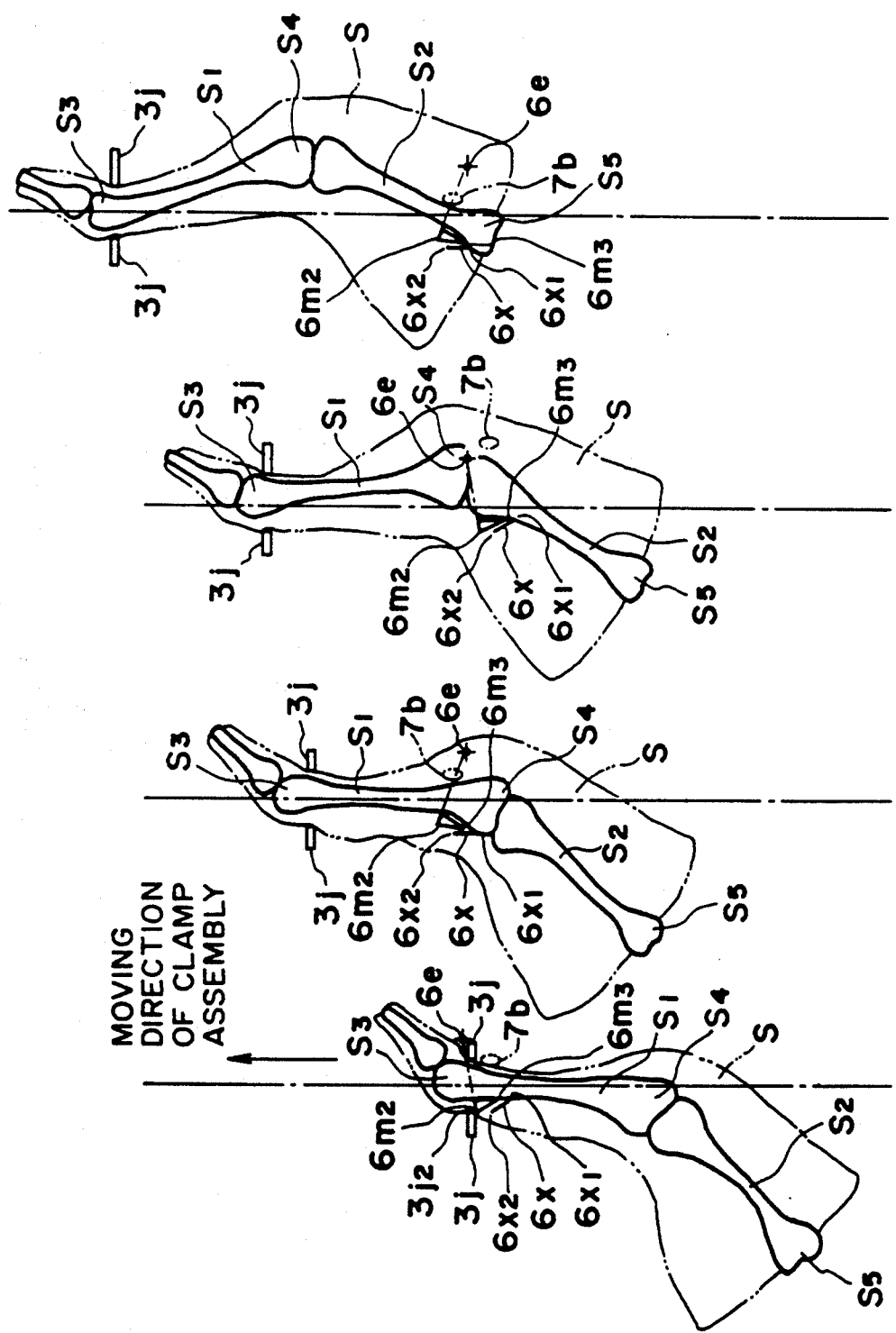
FIGS. 6A ~ 6D are plan views showing the operation of the cutting machine of FIG. 2.

When the clamp assembly 3 moves forward further, as shown in FIG. 6A, the sharp tip $6m_2'$ of the fixed cutting blade 6m, which has been moving downward, pierces into the meat of the leg S in the vicinity of the lower leg bone $S_1$ adjacent to the ankle $S_3$. As described above, the movable cutting blade 6x or the fixed cutting blade 6m is located in the vicinity of the left end of the cutout $3j_2$ of the second clamping member 3j and the lower leg bone $S_1$ inclines slightly rightward from its fore end to its rear end as viewed downward, so that the sharp tip $6m_2'$ of the fixed cutting blade 6m pierces into the leg S at the left of the lower leg bone $S_1$. The biasing roll 7b abuts against the leg S at the right of the movable cutting blade 6x and at the right of the lower leg bone $S_1$ so as to bias the leg S leftward. As a result, the leg S rotates, clockwise as viewed downward, around the ankle $S_3$. Thus, the lower leg bone $S_1$ extends in the longitudinal direction and the sharp tip $6m_2'$ of the fixed cutting blade 6m abuts against the left side surface of the lower leg bone $S_1$. When the sharp tip $6m_2'$ of the fixed cutting blade 6m has pierced into the meat of the leg S to the bone, the piston of $6a_1$ of the air cylinder $6a$ reaches the advanced position, and the sharp tip $6m_2'$ of the fixed cutting blade $6m$ is retained at that height.

The movable cutting blade $6x$ is in the initial rotational condition so that the right side surface of the lower portion $6m_2$ of the fixed cutting blade $6m$, the right side surface of which extends in the longitudinal direction, abuts closely against the left side surface of the lower leg bone $S_1$ which extends in the longitudinal direction. The movable cutting blade $6x$, which inclines slightly rightward from the fore edge $6x_2$ to the rear edge $6x_1$ as viewed downward, abuts against the left side surface of the lower leg bone $S_1$ extending in the longitudinal direction at its rear edge $6x_1$. The movable cutting blade $6x$ reciprocates in the vertical direction under the guidance of the left side surface of the lower portion $6m_2$ of the fixed cutting blade $6m$ so as to cut open the meat of the leg S. The movable cutting blade $6x$ is slender and abuts against the left side surface of the lower leg bone $S_1$ at its rear edge $6x_1$, so that the meat of the leg S is cut open at a position adjacent to the left side surface of the lower leg bone $S_1$. The rear edge $6x_1$ of the movable cutting blade $6x$ protrudes only slightly rearward from the cutting edge $6m_3$ of the lower portion $6m_2$ of the fixed cutting blade $6m$, so that the movable cutting blade $6x$ neither cuts into nor chips off the lower leg bone $S_1$.

As the clamp assembly 3 moves forward and the leg S moves forward, the meat of the leg S is cut open by the movable cutting blade $6x$ along the left side surface of the lower leg bone $S_1$ extending in the longitudinal direction. The opening made by the cutting blade $6x$ is further enlarged by the wedge shaped lower portion $6m_2$ of the fixed cutting blade $6m$.

When the meat of the leg S is cut open by the lower portion $6m_2$, it applies forward resistant force to the rear edge $6m_3$ of the lower portion $6m_2$. The movable cutting blade $6x$ and the fixed cutting blade $6m$ are located offset leftward relative to the rotation shaft $6e$, so that a resistant moment, directed opposite to the direction indicated by the double arrow in FIG. 2, is generated around the rotation shaft $6e$ by the forward resistant force applied to the rear edge $6m_3$. But, the forward resistant force is small because it is applied by the meat of the leg S, so that the resistant moment generated around the rotation shaft $6e$ does not exceed the initial moment $M_0$. Thus, the movable cutting blade $6x$ is retained in the initial rotational condition.

When the clamp assembly 3 moves forward further, as shown in FIG. 6B, the right side surface of the lower portion $6m_2$ of the fixed cutting blade $6m$ comes to abut against the portion of the lower leg bone $S_1$ adjacent to the knee joint $S_4$. The left side surface of the portion of the lower leg bone $S_1$ adjacent to the knee joint $S_4$ is curved and inclines leftward from its fore portion toward its rear portion. The right side surface of the lower portion $6m_2$ of the fixed cutting blade $6m$, which extends in the longitudinal direction, inclines relative to the left side surface of the lower leg bone $S_1$.

Thus, the left side surface of the lower leg bone $S_1$ applies forward resistant force to the rear edge $6m_3$ of the lower portion $6m_2$, which resistant force is larger than that applied by the meat of the leg S. Thus, a resistant moment which is larger than the initial moment $M_0$ is generated around the rotation shaft $6e$ by the forward resistant force applied by the left side surface of the lower leg bone $S_1$, so that the rotation shaft $6e$ rotates in the direction opposite to the direction indicated by the double arrow in FIG. 2 or clockwise as viewed downward against the biasing force of the coil spring $6g$.

Accordingly, the movable cutting blade $6x$ and the fixed cutting blade $6m$ rotate and move to a position to the left of and to the fore of the rotation shaft $6e$. The movable cutting blade $6x$ comes to incline leftward from the fore edge $6x_2$ toward the rear edge $6x_1$ as viewed downward, and the right side surface of the lower portion $6m_2$ of the fixed cutting blade $6m$ comes to incline leftward from its fore edge toward its rear edge as viewed downward.

As a result, the right side surface of the lower portion $6m_2$ of the fixed cutting blade $6m$ abuts again, closely against the left side surface of the lower leg bone $S_1$ which inclines leftward from its fore portion toward its rear portion. Thus, the operation for cutting open the meat of the leg S along the left side surface of the lower leg bone $S_1$ continues smoothly.

When the lower leg bone $S_1$ moves forward, the lower portion $6m_2$ of the fixed cutting blade $6m$ applies a rightward force to the lower leg bone $S_1$, so that the leg S rotates around the ankle $S_3$ counterclockwise as viewed in FIG. 6B, which causes the portion of the lower leg bone $S_1$ adjacent to the knee joint $S_4$ to move rightward. This rightward movement allows the portion of the lower leg bone $S_1$ adjacent to the knee joint $S_4$, which inclines leftward from the fore portion toward the rear portion to go smoothly through the space between the lower portion $6m_2$ of the fixed cutting blade $6m$ and the biasing roll $7b$.

When the clamp assembly 3 moves forward further, as shown in FIG. 6C, the portion of the lower leg bone $S_1$ adjacent to the knee joint $S_4$ passes by the fixed cutting blade $6m$. The rear edge $6m_3$ of the lower portion $6m_2$ of the fixed cutting blade $6m$ passes by the curved portion of the lower leg bone $S_1$ adjacent to the knee joint $S_4$ and protrudes into the meat in the vicinity of the knee joint $S_4$, so that the forward resistant force applied to the rear edge $6m_3$ decreases, which causes the resistant moment to decrease. Thus, the rotation shaft $6e$ rotates in the direction indicated by the double arrow in FIG. 2, following the biasing force of the spring $6g$, which causes the movable cutting blade $6x$ and the fixed cutting blade $6m$ to rotate back to their initial rotational position. As a result, the right side surface of the lower portion $6m_2$ of the fixed cutting blade $6m$ abuts closely against the left side surface of the knee joint $S_4$, which allows the operation for cutting open the meat of the leg S along the left side surface of the knee joint $S_4$ to be continued smoothly.

The lower portion $6m_2$ of the fixed cutting blade $6m$ applies a rightward force to the knee joint $S_4$, so that the leg S rotates around the ankle $S_3$ counterclockwise as viewed in FIG. 6C, which causes the knee joint $S_4$ to move rightward. The knee joint $S_4$ applies a rightward force to the biasing roll $7b$, so that the biasing roll $7b$ moves rightward against the biasing force of the spring $7f$, which makes the space between the lower portion $6m_2$ of the fixed cutting blade $6m$ and the biasing roll $7b$ increase.

The aforementioned rightward movement of the knee joint $S_4$ and the increase of the space between the lower portion $6m_2$ of the fixed cutting blade $6m$ and the biasing roll $7b$ allows the knee joint $S_4$ to go smoothly through the space between the lower portion $6m_2$ of the fixed cutting blade $6m$ and the biasing roll $7b$.

When the clamp assembly 3 moves forward further, as shown in FIG. 6D, the right side surface of the lower portion $6m_2$ of the fixed cutting blade $6m$ comes to abut against the upper leg bone $S_2$. The left side surface of the upper leg bone $S_2$ inclines leftward from its fore portion toward its rear portion, so that the right side surface of the lower portion $6m_2$ of the fixed cutting blade $6m$, which now extends in the longitudinal direction, inclines relative to the left side surface of the upper leg bone $S_2$.

Thus, the left side surface of the upper leg bone $S_2$ applies forward resistant force to the rear edge $6m_3$ of the lower portion $6m_2$. Thus, a resistant moment which is larger than the initial moment $M_0$ is generated around the rotation shaft $6e$ by the forward resistant force applied by the left side surface of the upper leg bone $S_2$, so that the rotation shaft $6e$ rotates in the direction opposite to the direction indicated by the double arrow in FIG. 2 or clockwise as viewed downward against the biasing force of the coil spring $6g$.

Accordingly, the movable cutting blade $6x$ and the fixed cutting blade $6m$ rotate and move to a position to the left of and to the fore of the rotation shaft $6e$. The movable cutting blade $6x$ comes to incline leftward from the fore edge $6x_2$ toward the rear edge $6x_1$ as viewed downward, and the right side surface of the lower portion $6m_2$ of the fixed cutting blade $6m$ comes to incline leftward from its fore edge toward its rear edge as viewed downward.

As a result, the right side surface of the lower portion $6m_2$ of the fixed cutting blade $6m$ once again abuts closely against the left side surface of the upper leg bone $S_2$. The upper leg bone $S_2$ inclines leftward from its fore portion toward its rear portion as viewed downward. Thus, the operation for cutting open the meat of the leg S along the left side surface of the upper leg bone $S_2$ continues smoothly. When the upper leg bone $S_2$ moves forward, the lower portion $6m_2$ of the fixed cutting blade $6m$ applies rightward force to the upper leg bone $S_2$, so that the leg S rotates around the ankle $S_3$ counterclockwise as viewed in FIG. 6D, which causes the upper leg bone $S_2$ to move rightward. This rightward movement allows the upper leg bone $S_2$ to go smoothly through the space between the lower portion $6m_2$ of the fixed cutting blade $6m$ and the biasing roll $7b$.

In the same manner as with the knee joint $S_4$, the operation for cutting open the meat of the leg S along the left side surface of the coxa $S_5$ continues smoothly. Thus, the operation for cutting open the meat of the leg S along the lower leg bone $S_1$ and the upper leg bone $S_2$ is completed.

When the aforementioned operation for cutting open the meat of the leg S is completed, the limit switch $8b$ detects the clamp assembly 3, the piston $6a_1$ of the air cylinder $6a$ retracts form the advanced position and the motor $6n$ stops.

Following to the retraction of the piston $6a_1$, the cutter base $6c$ or the cutter body $6k$ moves upward. Thus, the fixed cutting blade $6m$ and the movable cutting blade $6x$ move upward so that they leave the leg S. Following the stop of the motor $6n$, the movable cutting blade $6x$ stops reciprocating in the vertical direction.

When the clamp assembly 3 moves forward further, the guide-roll $3f$ passes by the fore end of the line cam 4. The first clamping member $3d$ is rotated counterclockwise as viewed forward by the biasing force of the spring $3h$. Thus, the clamp assembly 3 comes back to the initial condition. Then, the leg S is taken from the clamp assembly 3 by the operator.

As described above, the right side surface of the lower portion $6m_2$ of the fixed cutting blade $6m$ always abuts closely against the left side surfaces of the lower leg bone $S_1$ and the upper leg bone $S_2$. The movable cutting blade $6x$, which is guided by the left side surface of the lower portion $6m_2$ of the fixed cutting blade $6m$, cuts open the meat of the leg S. The rear edge $6x_1$ is always abutted against the left side surfaces of the lower leg bone $S_1$ and the upper leg bone $S_2$, so that the meat of the leg S is cut open along the lower leg bone $S_1$ and the upper leg bone $S_2$ without any meat being left on the bones. The rear edge $6x_1$ of the movable cutting blade $6x$ protrudes only slightly rearward from the rear edge $6m_3$ of the lower portion $6m_2$ of the fixed cutting blade $6m$, so that the movable cutting blade $6x$ neither cuts into nor chips off the bones.

The biasing roll assembly 7 may be freed from the cutter base $6c$ and be moved close to the fixed cutting blade $6m$ from right and away from the fixed cutting blade $6m$ to right.

The movable cutting blade $6x$ may be reciprocated by an air cylinder similar to the air cylinder $6a$, or by a cam rotated by a flexible shaft driven by a suitable motor. The cutter base $6c$ may be driven in the vertical direction by a link mechanism engaging a cam driven by the motor $1c$.

Figure 7:
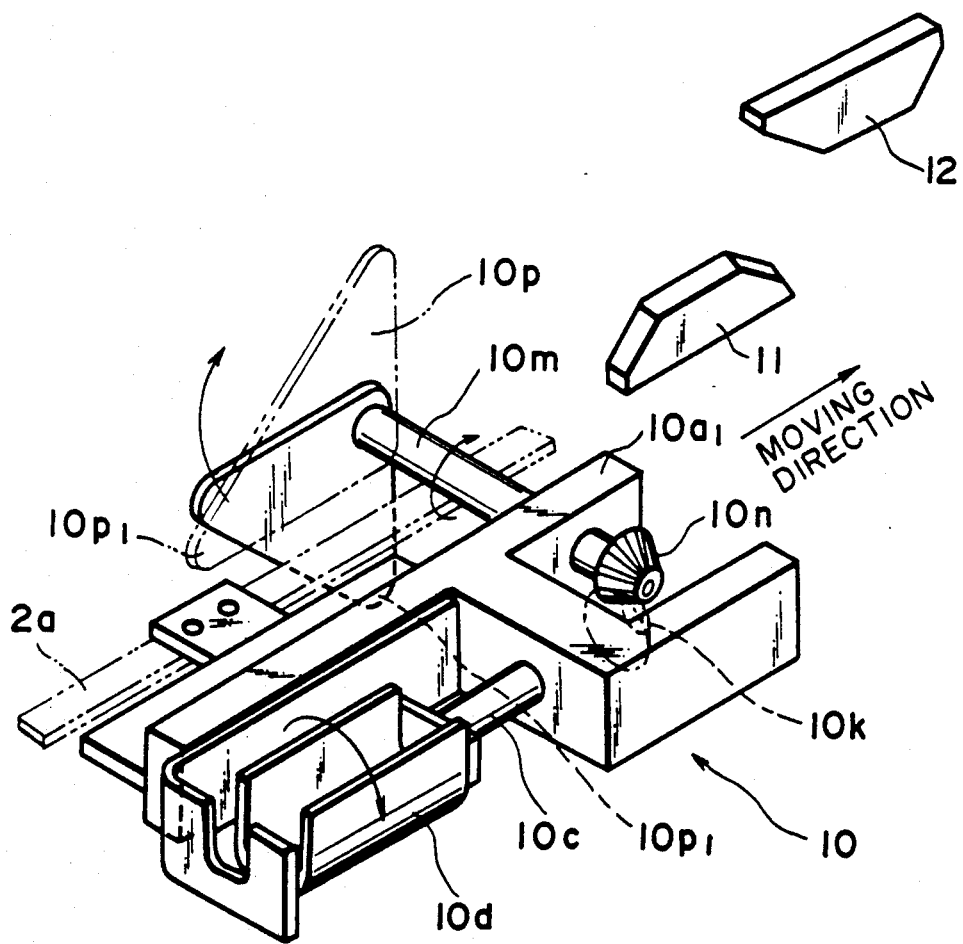
FIG. 7 is an enlarged detail of another embodiment of the clamp assembly of FIG. 3.

A variation of the clamp assembly as shown in FIG. 7 will now be discussed.

A clamp assembly 10 shown in FIG. 7 has a mechanism for rotating the first clamping member which is different from that of the clamp assembly 3 in FIG. 2.

The clamp assembly 10 has a bevel gear $10k$ fixed to the fore end of a shaft $10c$. The bevel gear $10k$ engages a bevel gear $10n$ fixed to the right end of a shaft $10m$. The shaft $10m$ extends in the transverse direction rotatably through a hole formed in a longitudinal leg $10a_1$. The shaft $10m$ fits in the hole formed in the leg $10a_1$ rotatably but tightly. Thus, the shaft $10m$ rotates only when it is provided with a large torque. A triangular cam plate $10p$ is fixed to the left end of the shaft $10m$. A baffle plate 11 is disposed above the mid portion of the upper run $2a$ of the endless chain 2. A baffle plate 12 is disposed above the fore end portion of the upper run $2a$ of the endless chain 2 and above the baffle plate 11. The baffle plates 11, 12 are fixed to the frame of the cutting machine A. As shown in FIG. 7, when the clamp assembly 10 is located in the vicinity of the rear end of the upper run $2a$ of the endless chain 2, the cam plate $10p$ is in a position indicated by a solid line wherein an apex $10p_1$ of the cam plate $10p$ is directed downward. In this position, the open end of a U-shaped groove of a first clamping member $10d$ is directed upward. When the clamp assembly 10 moves forward to the mid portion of the upper run $2a$ of the endless chain 2, an edge of the cam plate $10p$ extending upward from the apex $10p_1$ abuts against the baffle plate 11, so that the cam plate $10p$ rotates by 90° in the direction indicated by an arrow.

Thus, the cam plate $10p$ comes to be in a position indicated by a phantom line wherein the apex $10p_1$ of the cam plate $10p$ is directed rearward. Following to the rotation of the cam plate $10p$, the first clamping member $10d$ rotates by 90° in the direction indicated by an arrow.

Thus, the first clamping member $10d$ comes to be in a rotated position. As aforementioned, the shaft $10m$ tightly fits in the hole formed in the leg $10a_1$, so that the cam plate $10p$ is kept in the position indicated by the phantom line in FIG. 7 even after it goes through the baffle plate 11. Accordingly, the first clamping member 10d is kept in the rotated position. When the clamp assembly 10 moves forward further to the fore end portion of the upper run 2a of the endless chain 2, an edge of the cam plate 10p extending upward from an apex adjacent to the shaft 10m abuts against the baffle plate 12, so that the cam plate 10p rotates back to the position indicated by the solid line in FIG. 7. Thus, the first clamping member 10d comes back to the position indicated in FIG. 7.

The cutting machine A for a right leg has been described in the above. In the cutting machine A for a left leg, the clamp assembly 3, the line cam 4, the table 5, the cutter assembly 6 and the biasing roll assembly 7 should be disposed in a mirror image of those shown in FIG. 2 in association with a vertical plane which includes the endless chain 2.

Figure 8:
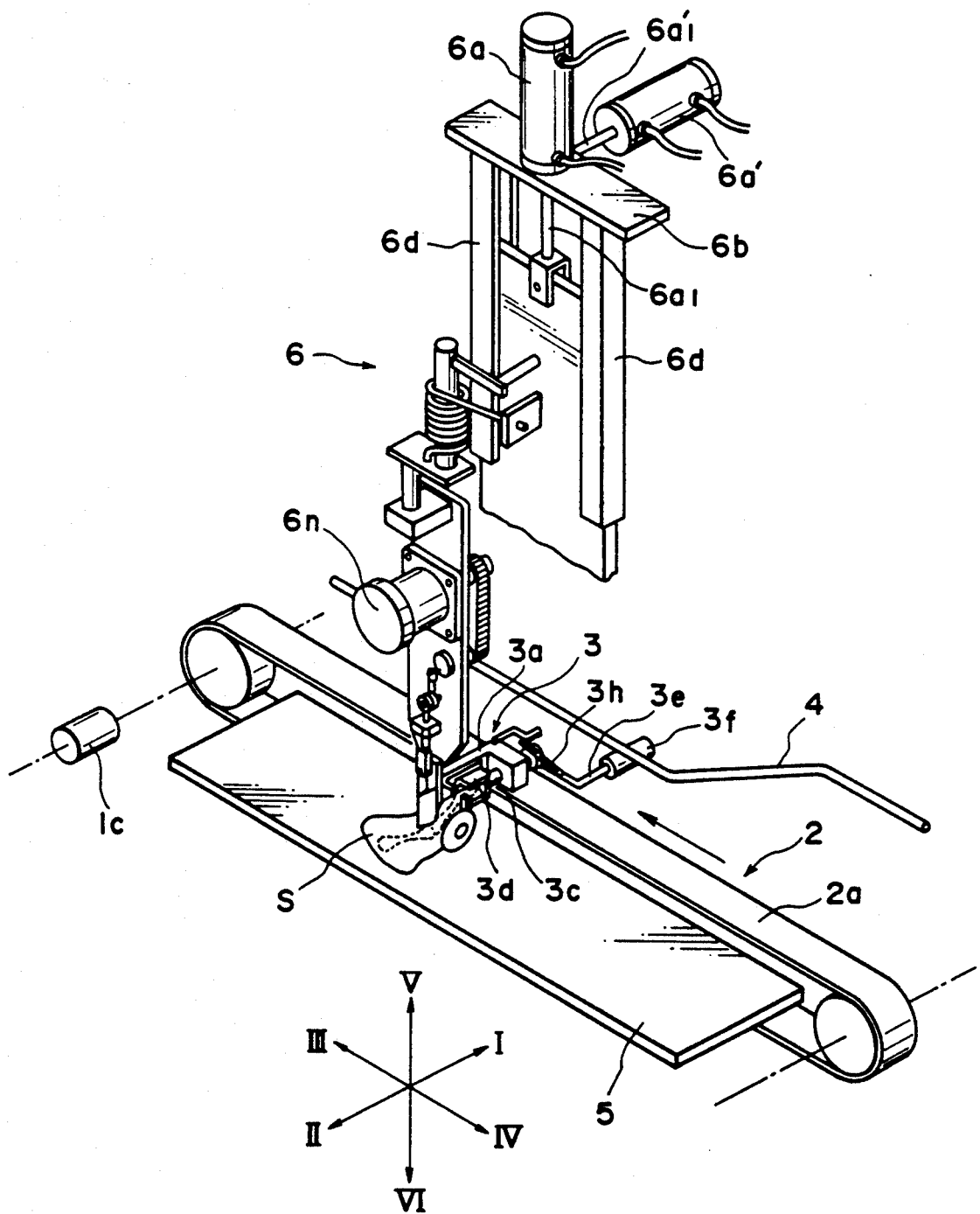
FIG. 8 is a perspective view of another embodiment of the cutting machine.

A second embodiment of the cutting machine A is shown in FIG. 8. The same members as in the first embodiment are denoted by the same reference numerals as in the first embodiment. In the following descriptions, the directions indicated by arrows I, II, III, IV, V and VI in FIG. 8 are referred to as forward direction, rearward direction, leftward direction, rightward direction, upward direction and downward direction, respectively. Moreover, in the following descriptions, the direction parallel to the arrows I, II is referred to as the longitudinal direction, the direction parallel to the arrows III, IV, is referred to as the transverse direction, and the direction parallel to the arrows V, VI is referred to as the vertical direction.

As understood from FIG. 8, in the second embodiment, the endless chain 2 is disposed in the transverse direction and the upper run 2a of the endless chain 2 is driven leftward. The body 3a of the clamp assembly 3 is fixed directly to the endless chain 2. The guide roll 3f is mounted on the free end portion of the arm 3e of the clamp assembly 3, which is bent forward. The line cam 4 is disposed to the fore of and above the upper run 2a of the endless chain 2 and extends transversely. The line cam 4 is located sufficiently above the upper run 2a in the vicinity of the right end portion of the upper run 2a. At the midway point of the upper run 2a, the line cam 4 is bent downward to a height a little higher than the upper run 2a. In the vicinity of the left end of the upper run 2a, the line cam 4 is located at a height a little higher than the upper run 2a. The table 5 is disposed to the rear of the endless chain 2, and extends in the transverse direction. The bracket 6b of the cutter assembly 6 is mounted movably in the longitudinal direction on the frame of the cutting machine A. The guides 6d are fixed to the bracket 6b. An air cylinder 6a' is directed longitudinally and is fixed to the frame of the cutting machine A. The piston 6a$_1$' of the air cylinder 6a' is connected to the bracket 6b. The operations of the motors 1c, 6n and the air cylinders 6a, 6a' are controlled not by the limit switches 8a, 8b, but by a sequence controller. Except as described above, the constitution of the second embodiment is the same as the first embodiment.

In this embodiment, the operation for cutting open the meat of the leg S is carried out as follows. That is, the leg S is set into the clamp assembly 3 which is located in the vicinity of the right end of the upper run 2a, where the line cam 4 is located sufficiently above the upper run 2a, so that the guide roll 3f does not engage the line cam 4, whereby the clamp assembly 3 is in the initial condition.

As the clamp assembly 3 moves leftward, the guide roll 3f engages the line cam 4. Thus, the guide roll 3f and the first clamping member 3d rotate by 90°, clockwise as viewed forward.

When the clamp assembly 3 has reached the position just below the cutter assembly 6, the motor 1c is stopped and the leftward movement of the clamp assembly 3 is stopped. Then the piston 6a$_1$ of the air cylinder 6a is advanced and the cutter assembly 6 is moved downward. After that, the piston 6a$_1$' of the air cylinder 6a' is advanced and the cutter assembly 6 is moved rearward so as to cut open the meat of the leg S. After the operation for cutting open the meat of the leg S is completed, the piston 6a$_1$ and 6a$_1$' retract, so that the cutter assembly 6 is moved upward and forward.

Then the motor 1c is restarted and the leftward movement of the clamp assembly 3 is restarted. The guide roll 3f passes by the left end of the line cam 4, so that the first clamping member 3d is rotated counterclockwise as viewed forward by the biasing force of the spring 3h. Thus, the clamp assembly 3 comes back to the initial condition. Then, the leg S is taken from the clamp assembly 3 by the operator.

In the second embodiment, a plurality of poultry legs can be processed simultaneously even in a small working space by means of disposing a plurality of cutter assemblies 6 along the endless chain 2.

It may be possible that, instead of the provision of the arm 3e, the guide roll 3f, the stopper 3g, the spring 3h and the line cam 4, a cam plate similar to the cam plate 10p in FIG. 7 is connected to the fore end portion of the shaft 3c of the clamp assembly 3, and a pair of baffle plates similar to the baffle plates 11, 12 in FIG. 7 are disposed transversely above the upper run 2a of the endless chain 2.

Working Table C

As shown in FIG. 1, the working table C has a belt conveyor 20 and a working table 21.

The leg S which is cut open by the cutting machine A is taken off the clamp assembly 3 by an operator at the fore end of the upper run 2a of the endless chain 2. Then, the leg S undergoes the sequential steps (2), (3) and (4) in the manual boning work on the working table C. The transportation of the leg S between the steps is achieved by the belt conveyor 20.

Second, Tendon Cutting Machine B

Figure 9:
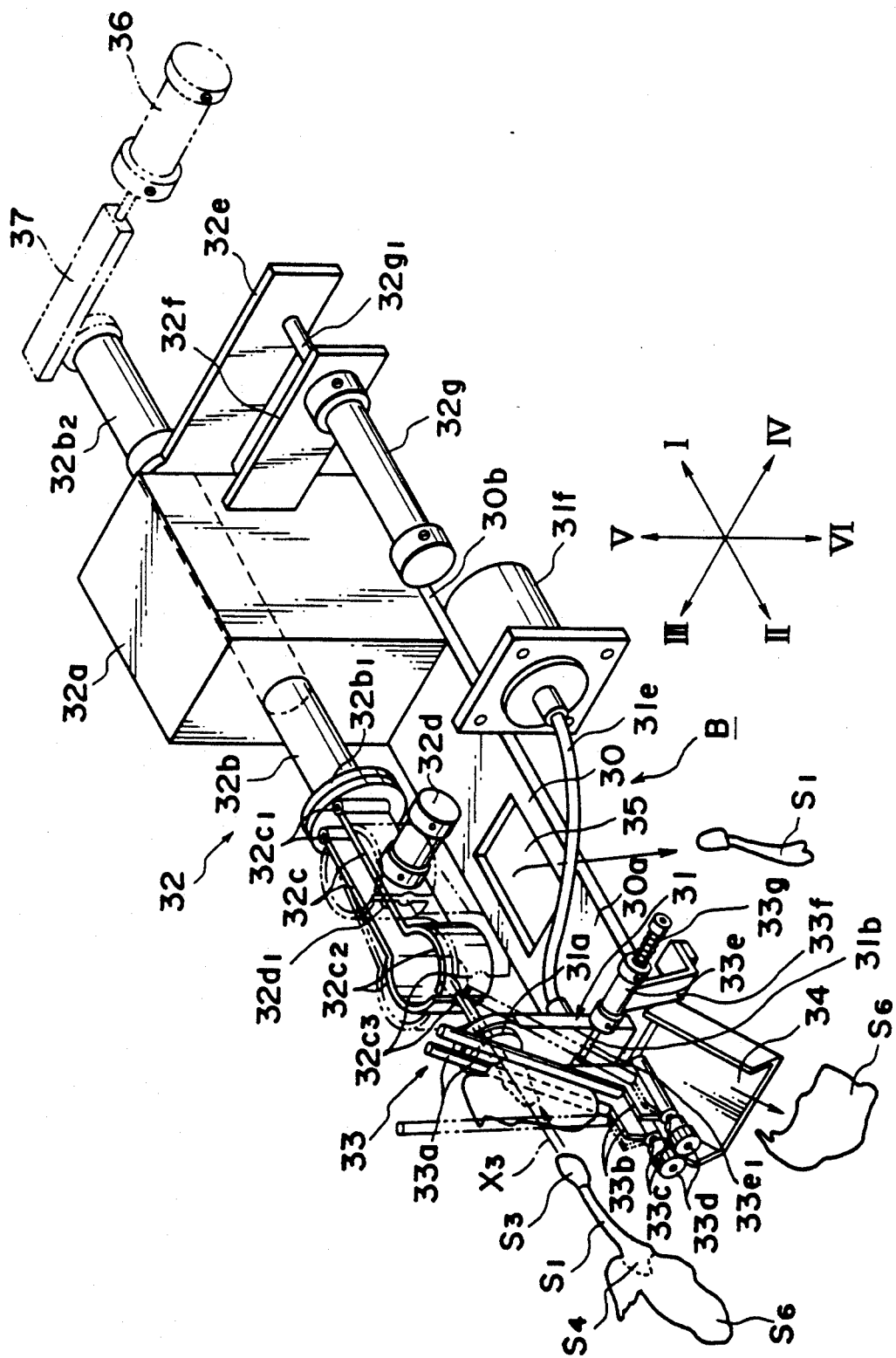
FIG. 9 is a perspective view showing a second, tendon cutting machine for removing the lower leg bone of the poultry leg, which defines a part of the poultry leg boning apparatus of FIG. 1.
Figure 10:
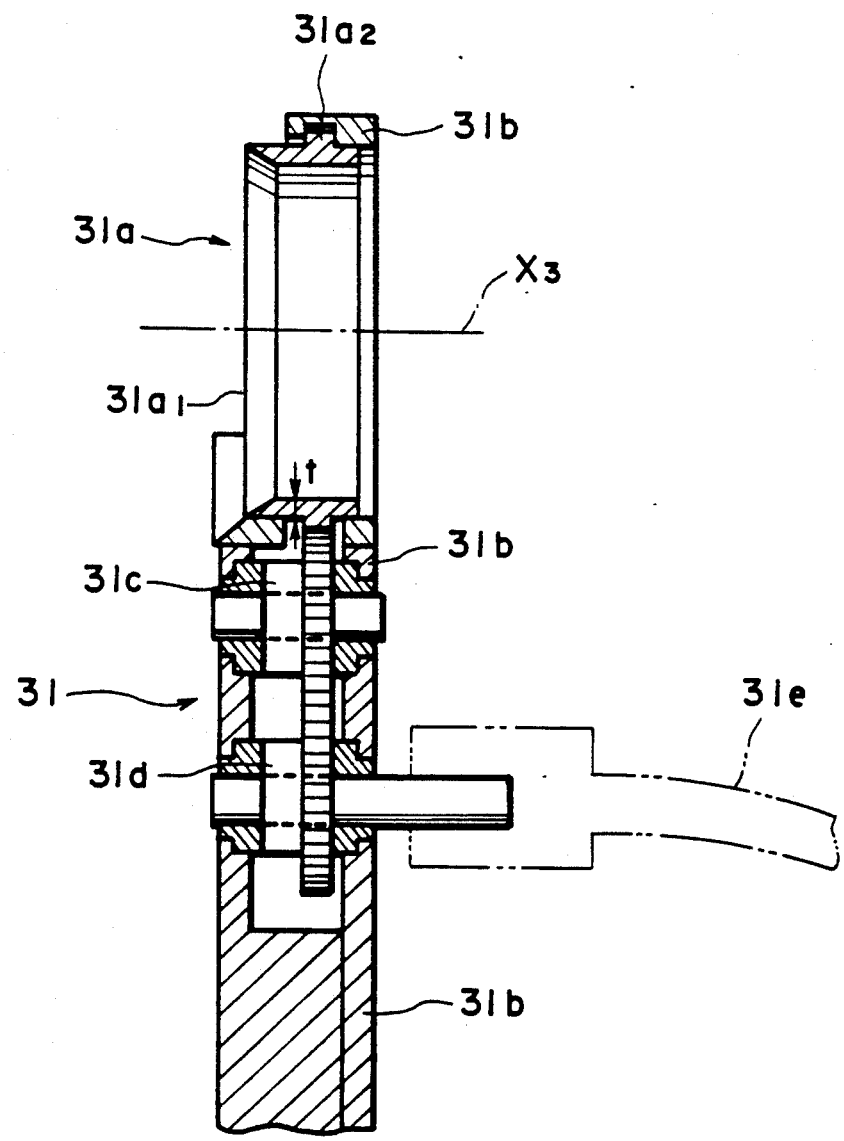
FIG. 10 is a cross-sectional view showing the construction of a cutter assembly of the second, tendon cutting machine of FIG. 9.

The tendon cutting machine B will be described with reference to FIGS. 9 to 11. In the following descriptions, the directions indicated by arrows I, II, III, IV, V and VI in FIG. 9 are referred to as forward direction, rearward direction, leftward direction, rightward direction, upward direction and downward direction, respectively. Moreover, in the following descriptions, the direction parallel to the arrows I, II is referred to as the longitudinal direction, the direction parallel to the arrows III, IV, is referred to as the transverse direction, and the direction parallel to the arrows V, VI is referred to as the vertical direction.

The tendon cutting machine B has a cutter assembly 31 disposed on the rear end of a rectangular supporting table 30 which extends longitudinally. As shown in FIGS. 9 and 10, the cutter assembly 31 has an annular cutting blade 31a, the central axis X$_3$ of which extends in the longitudinal direction.

The cutting blade 31a is provided with a cutting edge 31a$_1$ along its rear surface. The cutting edge 31a$_1$ is directed rearward. The cutting blade 31a is provided with teeth 31a₂ around its outer side surface. The cutting blade 31a has a sufficient thickness t so that it has a large rigidity. The cutting blade 31a is supported rotatably around the central axis $X_3$ by a casing 31b which is fixed to the supporting table 30 at its lower end. The portion of the casing 31b which accepts the cutting blade 31a is made dividable into a plurality of pieces so that the cutting blade 31a can be renewed.

An idling gear 31c is disposed below the cutting blade 31a. The idling gear 31c engages both the teeth 31a₂ and a driving gear 31d which is disposed below the idling gear 31c. The gears 31c and 31d are rotatably supported around their own axes by the casing 31b. The axes of gears 31c and 31d extend in the longitudinal direction.

The driving gear 31d is connected to a motor 31f by means of a flexible shaft 31e. Thus, the rotation of the motor 31f is transmitted to the cutting blade 31a through the flexible shaft 31e, the driving gear 31d and the idling gear 31c, and causes the cutting blade 31a to rotate around the central axis $X_3$.

A clamp assembly 32 is mounted on the fore end portion of the supporting table 30. As shown in FIG. 9, the clamp assembly 32 has a rod 32b which extends in the longitudinal direction through a supporting box 32a fixed to the supporting table 30. The rod 32b is supported by the supporting box 32a slidably in the longitudinal direction. The rod 32b is disposed coaxially with the central axis $X_3$ of the cutting blade 31a.

A pair of clamping arms 32c are disposed parallel to one another and extend in the longitudinal direction. The fore end 32c₁ of clamping arms 32c are connected to the rear end 32b₁ of the rod 32b so as to swing around vertical axes. The clamping arms 32c are provided with curved portions 32c₂ at their rear ends. The curved portions 32c₂ are provided with opposed, semicircular cutouts 32c₃ at their rear ends. One of the arms 32c is provided with an air cylinder 32d directed in the transverse direction.

The piston 32d₁ of the air cylinder 32d extends through one arm 32c and is pivotally attached to the other arm 32c. When the piston 32d₁ of the air cylinder 32d is in a retracted position, the clamping arms 32c are closed as indicated by the solid line in FIG. 9, and the cutouts 32c are close to one another. When the piston 32d₁ advances, the clamping arms 32c swing to an open position indicated by the phantom line in FIG. 9, and the cutouts 32c are apart from one another. A bracket 32e is connected to the fore end portion 32b₂ of the rod 32b immovably in the longitudinal direction relative to the rod 32b.

The bracket 32e is connected to the piston 32g₁ of an air cylinder 32g which extends parallel to the rod 32b and is fixed to the supporting box 32a by a bracket 32f. When the piston 32g₁ of the air cylinder 32g is in a retracted position, the clamping arms 32c are in the initial position indicated by the solid line in FIG. 9, and are close to the cutting blade 31a. When the piston 32g₁ of the air cylinder 32g advances, the rod 32b moves forward and thus the clamping arms 32c move to the working position indicated by the phantom line in FIG. 9, and are apart from the cutting blade 31a.

A biasing assembly 33 is disposed on the rear end 30a of the supporting table 30 and to the rear of the cutter assembly 31. The biasing assembly 33 has a pair of rods 33a which extend on either side of the axis $x_3$ and parallel to one another. The rods 33a are inclined upward from their rear ends toward their fore ends.

The rods 33a are fixed to a pair of shafts 33c by a pair of brackets 33b. The shafts 33c extend parallel to the axis $x_3$ and are provided with a pair of gears 33d at their rear ends. The pair of gears 33d engage with one another. One of the brackets 33b is connected to the piston 33e₁ of an transversely disposed air cylinder 33e. The air cylinder 33e is fixed to the rear end 30a of the supporting table 30 by a bracket 33f. When the piston 33e₁ of the air cylinder 33e is in a retracted position, the rods 33a are closed as indicated by the solid line in FIG. 9 by the biasing force of a spring 33g which is mounted on the piston 33e₁. When the piston 33e₁ advances, the gears 33d rotate and thus, the pair of rods 33a move to an open position indicated by the phantom line in FIG. 9.

The supporting table 30 is provided with an inclined shute 34 at its rear end. The table 30 is provided with an opening 35 at its mid portion, below where the cutout 32c₃ of the clamping arm 32c are in the working position.

The air cylinders 32d, 32g, 33e, and the motor 31f are controlled by a sequence controller which is not illustrated in FIG. 9 for simplicity.

Figure 11A:
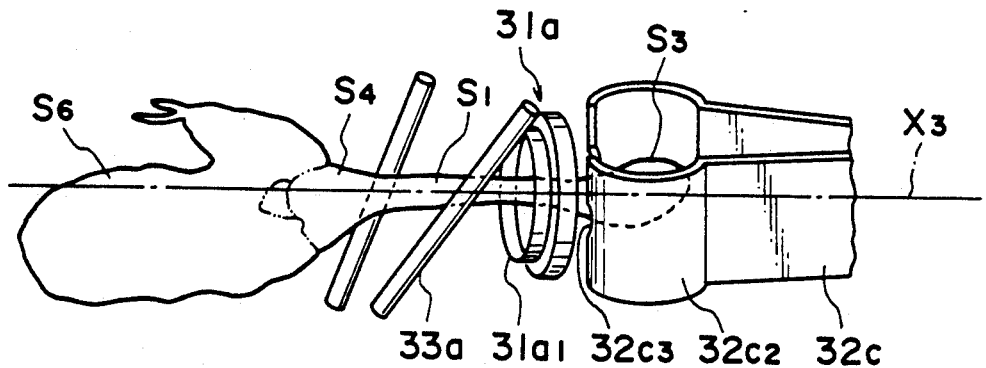
FIGS. 11A ~ 11C are perspective views showing the operation of the tendon cutting machine of FIG. 9.

The operation of the tendon cutting machine B constructed as above, will be described hereinafter with reference to FIGS. 11A to 11C.

① The meat around the lower leg bone $S_1$ is peeled off manually along the lower leg bone $S_1$ from the ankle $S_3$ toward the knee joint $S_4$, so that the meat $S_6$ of the leg is connected only to the knee joint $S_4$ by meat-to-bone connecting tendon tissues. Then, as shown in FIG. 11A, the lower leg bone $S_1$ is passed through the cutting blade 31a from the rear side of the cutting blade 31a toward the fore side of the cutting blade 31a, with the ankle $S_3$ being directed forward. The piston 32g₁ of the air cylinder 32g is in the retracted position, so that the clamping arms 32c are in the initial position wherein the clamping arms 32c are close to the cutting blade 31a. The piston 32d₁ of the air cylinder 32d is in the advanced position, so that the clamping arms 32c are in the open position. The piston 33e₁ of the air cylinder 33e is in the advanced position, so that the pair of rods 33a of the biasing assembly 33 are in the open position. The motor 31f does not operate, so that the cutting blade 31a does not rotate.

Figure 11B:
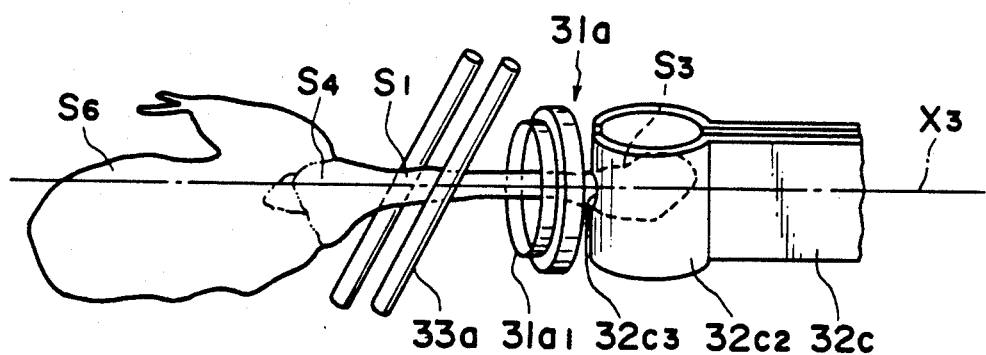

② As shown in FIG. 11B, the piston 32d₁ retracts so as to close the clamping arms 32c. Thus, the portion of the lower leg bone $S_1$ adjacent to the ankle $S_3$ is clamped by the clamping arms 32c at the closely-opposed cutouts 32c₃. The piston 33e₁ of the air cylinder 33e retracts so as to close the rods 33a of the biasing assembly 33. Thus, the lower leg bone $S_1$ is clamped by the rods 33a. The motor 31f starts so as to rotate the cutting blade 31a.

Figure 11C:
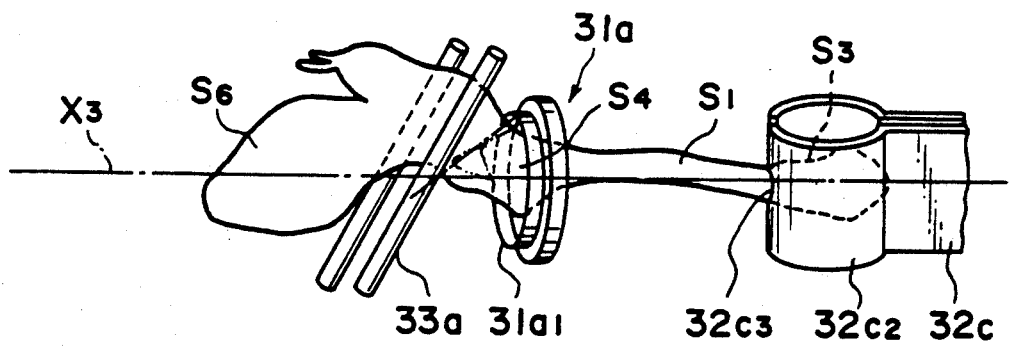

③ As shown in FIG. 11C, the piston 32g₁ of the air cylinder 32g advances so as to move the clamping arms 32c forward to the working position. Thus, the lower leg bone $S_1$ clamped by the clamping arms 32c moves forward through the cutting blade 31a, and the meat $S_6$ abuts against the rods 33a of the biasing assembly 33. As meat $S_6$ moves forward, it moves upward along the upwardly-inclined rods 33a. Thus, the upper portion of the knee joint $S_4$ is pressed against the cutting edge 31a₁ of the cutting blade 31a, so that the meat-to-bone connecting tendon tissues which connect the meat $S_6$ to the knee joint $S_4$ are cut off the knee joint $S_4$. As a result, the meat $S_6$ is removed from the lower leg bone $S_1$.

④ Lastly, the piston $33e_1$ of the air cylinder $33e$ advances so as to open the rods $33a$ of the clamping assembly 33. Thus, the meat $S_6$ which is removed from the lower leg bone $S_1$ falls on to the shute 34 and then falls into a collecting box (not shown). When the clamping arm $32c$ has reached the working position, the motor $31f$ stops, and then the piston $32d_1$ of the air cylinder $32d$ advances so as to open the clamping arms $32c$. Thus, the lower leg bone $S_1$, which is now free from the meat $S_6$, falls through the opening 35 into another collecting box (not shown). Then, the piston $32g_1$ of the air cylinder $32g$ retracts so as to move the clamping arms $32c$ rearward back to the initial position. Thus, the tendon cutting machine B returns to the initial condition described in ①.

As clearly understood from the above descriptions, according to the second, tendon cutting machine B, the meat-to-bone connecting tendon tissues which connect the meat $S_6$ to the knee joint $S_4$ are cut off the knee joint $S_4$ by the annular cutting blade $31a$. The cutting blade $31a$ is disposed at a predetermined position, has a large rigidity and rotates around the axis $x_3$, and the knee joint $S_4$ is biased against the cutting edge $31a_1$ of the blade $31a$.

Thus, different from the existing manual boning process with a knife, the cutting edge $31a_1$ can stably abut against the meat-to-bone connecting tendon tissues during the cutting operation. Thus, the boning work is made safe and the cut surface of the meat $S_6$ is made smooth, which increases the commercial value of the meat $S_6$. The knee joint $S_4$ is biased against the cutting edge $31a_1$, so that the meat-to-bone connecting tendon tissues are cut in the vicinity of the knee joint $S_4$. Thus, a high yield of the meat $S_6$ removed from the lower leg bone $S_1$ can be achieved.

The biasing force is generated by the upward movement of the meat $S_6$ along the rods $33a$, so that the biasing force can be easily controlled by controlling the inclination of the rods $33a$, the spring constant of the spring $33g$, etc,. The supporting table 30 is provided with a shute 34 and the opening 35, so that the meat $S_6$ and the lower leg bone $S_1$ can be collected separately. Thus, the boning process can be carried out efficiently.

The clamping arm $32c$ may further be reciprocally rotated around the longitudinal axis of the rod $32b$. Thus, the meat-to-bone connecting tendon tissues can be cut around the knee joint $S_4$, so that the yield of the meat $S_6$ removed from the lower leg bone $S_1$ can be more increased. In this case, as indicated by a phantom line in FIG. 9, a rack-pinion mechanism 37 is disposed so as to reciprocally rotate the rod $32b$ around its longitudinal axis. The rack-pinion mechanism 37 is driven by an air cylinder 36.

The cutter assembly 31 and the biasing assembly 33 may be moved in the longitudinal direction instead of the clamping arms $32c$.

While the present invention has been described with reference to preferred embodiments, one of ordinary skill in the art will recognize that modifications and improvements may be made while remaining within the spirit and scope of the present invention. The scope of the invention is determined solely by the appended claims.

I claim:

1. A tendon cutting machine for removing the lower leg bone from a poultry leg, which comprises:
    a rigid annular cutting blade having an annular cutting edge and a side away from the cutting edge;
    supporting means for supporting the annular cutting blade rotatably around a central axis;
    first driving means for rotating the annular cutting blade around the central axis;
    clamping means for clamping the ankle of the leg, which clamping means is disposed coaxially with the central axis of the annular cutting blade, and apart from the annular cutting blade toward the side away from the cutting edge;
    second driving means for generating a relative movement between the clamping means and the annular cutting blade in the direction of the central axis of the annular cutting blade; and
    biasing means for biasing the knee joint of the leg against the cutting edge of the annular cutting blade.

2. A tendon cutting machine of claim 1 wherein said biasing means comprises:
    a pair of rods disposed apart from the annular cutting blade on the side of the cutting edge thereof, extending on either side of the central axis and being inclined relative to the central axis.

3. A tendon cutting machine of claim 1 further having means for separately collecting the lower leg bone and the meat removed from the lower leg bone.

4. A tendon cutting machine for removing the lower leg bone from a poultry leg, which comprises:
    a rigid annular cutting blade having an annular cutting edge and a side away from the cutting edge;
    supporting means for supporting the annular cutting blade rotatably around a central axis;
    first driving means for rotating the annular cutting blade around the central axis;
    clamping means for clamping the ankle of the leg, which clamping means is disposed coaxially with the central axis of the annular cutting blade, and apart from the annular cutting blade toward the side away from the cutting edge;
    second driving means for generating a relative movement between the clamping means and the annular cutting blade in the direction of the central axis of the annular cutting blade;
    biasing means for biasing the knee joint of the leg against the cutting edge of the annular cutting blade; and
    third driving means for reciprocally rotating the clamping means around the central axis of the annular cutting blade.

5. A tendon cutting machine of claim 4 wherein said biasing means comprises:
    a pair of rods disposed apart from the annular cutting blade on the side of the cutting edge thereof, extending on either side of the central axis and being inclined relative to the central axis.

6. A tendon cutting machine of claim 5 further having means for separately collecting the lower leg bone and the meat removed from the lower leg bone.

* * * * *